US008902042B2

(12) United States Patent
Davis et al.

(10) Patent No.: US 8,902,042 B2
(45) Date of Patent: Dec. 2, 2014

(54) METHODS OF CONTROLLING ACCESS TO REAL ESTATE PROPERTIES

(75) Inventors: Lynne Parker Davis, Marietta, GA (US); Barrett Davis, Marietta, GA (US)

(73) Assignee: LPD, L.L.C., Marietta, GA (US)

( * ) Notice: Subject to any disclaimer, the term of this patent is extended or adjusted under 35 U.S.C. 154(b) by 315 days.

(21) Appl. No.: 13/485,852

(22) Filed: May 31, 2012

(65) Prior Publication Data

US 2012/0299700 A1 Nov. 29, 2012

Related U.S. Application Data

(63) Continuation-in-part of application No. 13/354,283, filed on Jan. 19, 2012, now abandoned, which is a continuation-in-part of application No. 11/749,743, filed on May 16, 2007, now abandoned.

(60) Provisional application No. 60/747,410, filed on May 16, 2006.

(51) Int. Cl.
*B60R 25/00* (2013.01)
*G07C 9/00* (2006.01)

(52) U.S. Cl.
CPC .... *G07C 9/00571* (2013.01); *G07C 2009/0042* (2013.01); *G07C 9/00896* (2013.01); *G07C 9/0069* (2013.01); *G07C 9/00015* (2013.01); *G07C 2009/00769* (2013.01)
USPC ........... 340/5.73; 340/5.1; 340/5.2; 340/5.21; 340/5.22; 340/5.7; 340/5.86

(58) Field of Classification Search
None
See application file for complete search history.

(56) References Cited

U.S. PATENT DOCUMENTS

| | | | | |
|---|---|---|---|---|
| 4,609,780 | A | 9/1986 | Clark | |
| 4,838,052 | A | 6/1989 | Williams et al. | |
| 5,612,683 | A | 3/1997 | Trempala et al. | |
| 5,705,991 | A | 1/1998 | Kniffin et al. | |
| RE37,011 | E | 1/2001 | Dawson et al. | |
| 6,989,732 | B2 | 1/2006 | Fisher | |
| 2003/0179075 | A1 | 9/2003 | Greenman | |
| 2004/0252017 | A1 | 12/2004 | Holding et al. | |
| 2005/0168320 | A1 | 8/2005 | Henderson et al. | |
| 2005/0206499 | A1 | 9/2005 | Fisher | |
| 2007/0271112 | A1 | 11/2007 | Davis | |
| 2008/0028230 | A1 | 1/2008 | Shatford | |
| 2008/0154774 | A1 * | 6/2008 | Dennison et al. | 705/51 |
| 2010/0223170 | A1 * | 9/2010 | Bahar | 705/34 |
| 2013/0275315 | A1 * | 10/2013 | Mergenthaler | 705/314 |

OTHER PUBLICATIONS

Information Disclosure Statement (IDS) Leter Regarding Common Patent Application(s), dated Aug. 28, 2012.

* cited by examiner

*Primary Examiner* — Curtis King
(74) *Attorney, Agent, or Firm* — Tillman Wright, PLLC; James D. Wright

(57) ABSTRACT

A method of controlling access to a real estate property includes installing a dynamic electronically-controlled lockset on an exterior door of a real estate property, maintaining, at a remote location, a reference device adapted to present a value of a second dynamic access code to one or more users located in the real estate office, receiving, at the real estate agent location, a request from a user for a current value of the second dynamic access code, examining the reference device to determine the current value of the second dynamic access code, and providing the current value of the second dynamic access code to the user for input into the electronically-controlled lockset. The lockset is adapted to unlock upon receiving a value corresponding to a first dynamic access code programmed therein. The second dynamic access code is time-synchronized with the first dynamic access code programmed in the electronically-controlled lockset.

20 Claims, 11 Drawing Sheets

METHODS OF CONTROLLING ACCESS TO REAL ESTATE PROPERTIES

CROSS-REFERENCE TO RELATED APPLICATIONS

The present application is a U.S. continuation-in-part patent application of, and claims priority under 35 U.S.C. §120 to, U.S. nonprovisional patent application Ser. No. 13/354,283, filed on Jan. 19, 2012 now abandoned; such '382 application is a U.S. continuation-in-part patent application of, and claims priority under 35 U.S.C. §120 to, U.S. nonprovisional patent application Ser. No. 11/749,743, filed on May 16, 2007 now abandoned and published as US 2007/0271112 A1; and such '743 application is a U.S. nonprovisional patent application of, and claims priority under 35 U.S.C. §119(e) to, U.S. provisional patent application Ser. 60/747,410, filed May 16, 2006. The entirety of each of the foregoing nonprovisional applications, and the publication of the latter nonprovisional application, are incorporated by reference herein.

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE PRESENT INVENTION

1. Field of the Present Invention

The present invention relates generally to methods of controlling access to real estate properties, and, in particular, to methods of using an electronic door lock control system in conjunction with direct real-time communication between a prospective home buyer and a real estate agent or other service provider.

2. Background

Builders have traditionally contracted with real estate agents to represent them in the sale of their new homes with the expectation that agents would provide access, sales and security. They count on agents to facilitate the showing of their new properties to prospective buyers, with or without the accompaniment of the agents themselves. In large subdivisions with dozens of new homes being built, agents are available "on-site" certain hours of the day to open and sell these new homes, and keep the properties secure.

However, with the dearth of areas suitable for large developments today in many markets, builders are constructing "infill" homes, that is, new homes in existing neighborhoods. Currently, agents mount a mechanical key-holding device on the front door of such properties to provide access to other agents. These other agents have a personal device which they use to interact with the doorknob-mounted device to open it and to access a key to the front door of the property. As they leave, they lock the door and place the key back in the doorknob-mounted device.

For a buyer without a buyer's agent to tour a newly built home, he/she calls the listing agent of record and requests a tour. The agent typically has to drive over to the property immediately to open the home for the prospective buyer, or set an appointment to meet there at a later time. Because of the hassles involved, buyers often do not call an agent for a tour unless they have exceptional interest. Agents find it a hassle to have to drop everything to show these homes, often only to discover the buyers to be "tire-kickers." Agents with multiple properties must devote a considerable amount of time to this process with little return on their investment of time and money. As a result, builders' properties are not shown as often as they would like. In desperation, some builders encourage buyer tours by unlocking their mostly-completed homes during the daylight hours and locking them back up every night. They know that buyers need to explore/touch/see the houses in order to have interest in and come to buy a property.

At the current time in the real estate market, there is not a keyless lock that works on a time rotation or sequence-based code, which could be used for Builder's new properties. The products that are available involve (1) opening a box and extracting a key or (2) keyless unlocking via a punched in code but the code in the lock has to be changed manually if it can be changed at all. Both present significant security risks since both the key and the unchanged code could fall into the wrong people's hands. Thus, a need exists for a dynamic electronic door lock control system using periodically-changing access codes to control access to properties being offered for sale or lease.

SUMMARY OF THE PRESENT INVENTION

The present invention would allow access, sales and security of a new property without an agent having to be present. Builders' properties would be more accessible to buyers without agents. Builders would have a clearer picture of the buyers touring their properties and post-tour feedback from the buyers. They would not have to risk leaving their properties unsecured in order to encourage tours. Agents would be able to avoid last-minute scheduling snafus, handle more "infill" properties at a time, could serve the builders better in terms of qualifying prospective buyers before letting them in the home, and benefit from having the buyer's cell phone or home number for follow-up feedback and possible other-tour sales. Further advantages could be realized in a wide variety of other real estate contexts, including traditional new developments, commercial properties, vacation rentals, and the like, all as described herein.

Broadly defined, the present invention according to one aspect is a method of controlling access to a real estate property, including: installing a dynamic electronically-controlled lockset on an exterior door of a building constituting a real estate property, the lockset being adapted to unlock upon receiving, as input, a value corresponding to a first dynamic access code programmed therein; maintaining, at a real estate agent location that is located remotely from the real estate property, a reference device adapted to present a value of a second dynamic access code to one or more users located in the real estate office, the second dynamic access code being time-synchronized with the first dynamic access code programmed in the electronically-controlled lockset; receiving, at the real estate agent location, a request from a user for a current value of the second dynamic access code; examining the reference device to determine the current value of the second dynamic access code; and providing the current value of the second dynamic access code to the user for input into the electronically-controlled lockset.

In further features of this aspect, the method further includes receiving, by the electronically-controlled lockset, the current value of the second dynamic access code as input by the user, and if the received value of the second dynamic access code is the same as the first dynamic access code, unlocking the lockset; and the method further includes the steps of changing, on a periodic basis, the value of the first dynamic access code, and changing, on a periodic basis, the value of the second dynamic access code such that the value of the second dynamic access code remains synchronized with the value of the first dynamic access code.

In another feature of this aspect, the method further includes the step of preventing an unauthorized user from retrieving the first dynamic access code from the electronically-controlled lockset.

In another feature of this aspect, the step of installing includes installing a dynamic electronically-controlled lockset having a housing that encloses an electronics assembly including a control module that receives inputs from both an electronic code module and a user input device. In a further feature of this aspect, the method further includes comparing, by the control module, the received value of the second dynamic access code to the first dynamic access code.

In another feature of this aspect, the method further includes the step of generating each value of the first dynamic access code using a pseudorandom number generation algorithm. In another feature, the method further includes the step of generating each value of the second dynamic access code using the same pseudorandom number generation algorithm that is used to generate each value of the first dynamic access code. In still another feature, generating each value of the first and second dynamic access codes includes incorporating a value representative of a current time and a value identifying the lockset.

In another feature of this aspect, the step of maintaining a reference device includes maintaining the reference device at a real estate office that is located remotely from the real estate property.

In another feature of this aspect, the step of maintaining a reference device includes maintaining the reference device on the person of a real estate agent located remotely from the real estate property.

In another feature of this aspect, the step of examining the reference device includes examining a digital display that visually presents the current value of the second dynamic access code.

The present invention according to another aspect is a dynamic electronic door lock control system, including: a dynamic electronically-controlled lockset, the lockset including a user input device, a lock interface operable to unlock a door if the lockset receives, via the user input device, input, in the form of a value, that matches a first dynamic access code residing internally in the lockset and not made readily available to unauthorized users; and a reference device including a user interface for presenting, to a user, a current value of a second dynamic access code residing internally in the reference device; wherein the first dynamic access code and the second dynamic access codes are synchronized such that they change frequently and at substantially similar points in time.

In features of this aspect, the first and second dynamic access codes change on a regular periodic basis such that the value of the second dynamic access code remains synchronized with the value of the first dynamic access code; and the dynamic electronically-controlled lockset includes a housing that encloses an electronics assembly including a control module that receives inputs from both an electronic code module and a user input device.

In another feature of this aspect, the lock interface is connected to the control module and responsive to one or more control signals provided by the control module.

In another feature of this aspect, the lock interface is operable to unlock the door if the inputs from both the electronic code module and the user's input device are substantially similar.

In another feature of this aspect, the input provided by the electronic code module to the control module is representative at any time of the value of the first dynamic access code.

In another feature of this aspect, the electronic code module includes a pseudorandom number generator using an algorithm to generate a sequence of first dynamic access code values. In further features, the reference device includes a pseudorandom number generator using the same algorithm to generate a sequence of second dynamic access code values; and each value of the first and second dynamic access codes incorporates a value representative of a current time and a value identifying the lockset.

In another feature of this aspect, the reference device is portable. In a further feature, the second dynamic access code provided by the portable reference device must be presented via a user input device of the electronically-controlled lockset within a limited time window in order to cause the lockset to unlock.

In another feature of this aspect, the reference device includes a digital display which visually presents a current value of the second dynamic access code.

The present invention according to another aspect is a method of controlling access to the interior of a real estate property, including: installing a dynamic electronically-controlled lockset on an exterior door of a building constituting a real estate property, the lockset being operable to unlock the door if a user enters a sequence of numbers into the lockset corresponding to a first dynamic access code residing internally in the lockset and not made readily available to unauthorized users; providing a reference device to a listing agent; making information available to persons seeking to gain access to the interior of the building as to how to make contact with the listing agent; when the listing agent receives contact from a particular person seeking to gain access to the interior of the building, determining whether to approve the particular person for interior access to the building; if the particular person is approved for interior access to the building, providing, by the listing agent, a second dynamic access code to the particular person, wherein the second dynamic access code is synchronized with the first dynamic access code contained within the lockset, the first and second dynamic access codes being synchronized such that they change at substantially similar points in time.

The present invention according to another aspect is a business method of building and/or securing market share for real estate agents listing properties for sale or lease, including: granting, by a distributor, rights to a real estate agent to utilize a dynamic electronic door lock control system in a particular, defined geographic area, the rights being applicable only in the particular, defined geographic area; providing multiple units of a dynamic electronically-controlled lockset to the real estate agent, each for mounting on an exterior door of a building constituting a real estate property and for controlling access to the interior of the building thereby, the lockset being adapted to open upon receiving, as input, a sequence of numbers corresponding to an access code programmed therein; and providing at least one reference device to the real estate agent, the reference device being synchronized with one or more of the multiple dynamic electronically-controlled locksets such that the reference device may be examined to determine the current value of an access code that may be entered into the one or more locksets in order to gain access to a respective building.

The present invention according to another aspect is a business method of managing interior access to a plurality of real estate properties, including: providing multiple units of a dynamic electronically-controlled lockset to a plurality of real estate business entities, each for mounting on an exterior door of a building constituting a real estate property and for controlling access to the interior of the building thereby, the lockset being adapted to open upon receiving, as input, a sequence of numbers corresponding to an access code programmed therein; establishing a call center for receiving interior access requests from a plurality of interested individuals; and providing at least one reference device to the call center, the reference device being synchronized with one or more of the multiple units of the dynamic electronically-controlled locksets such that the reference device may be examined to determine the current value of an access code that may be entered into the one or more locksets in order to gain access to a respective building.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

Figure 1:
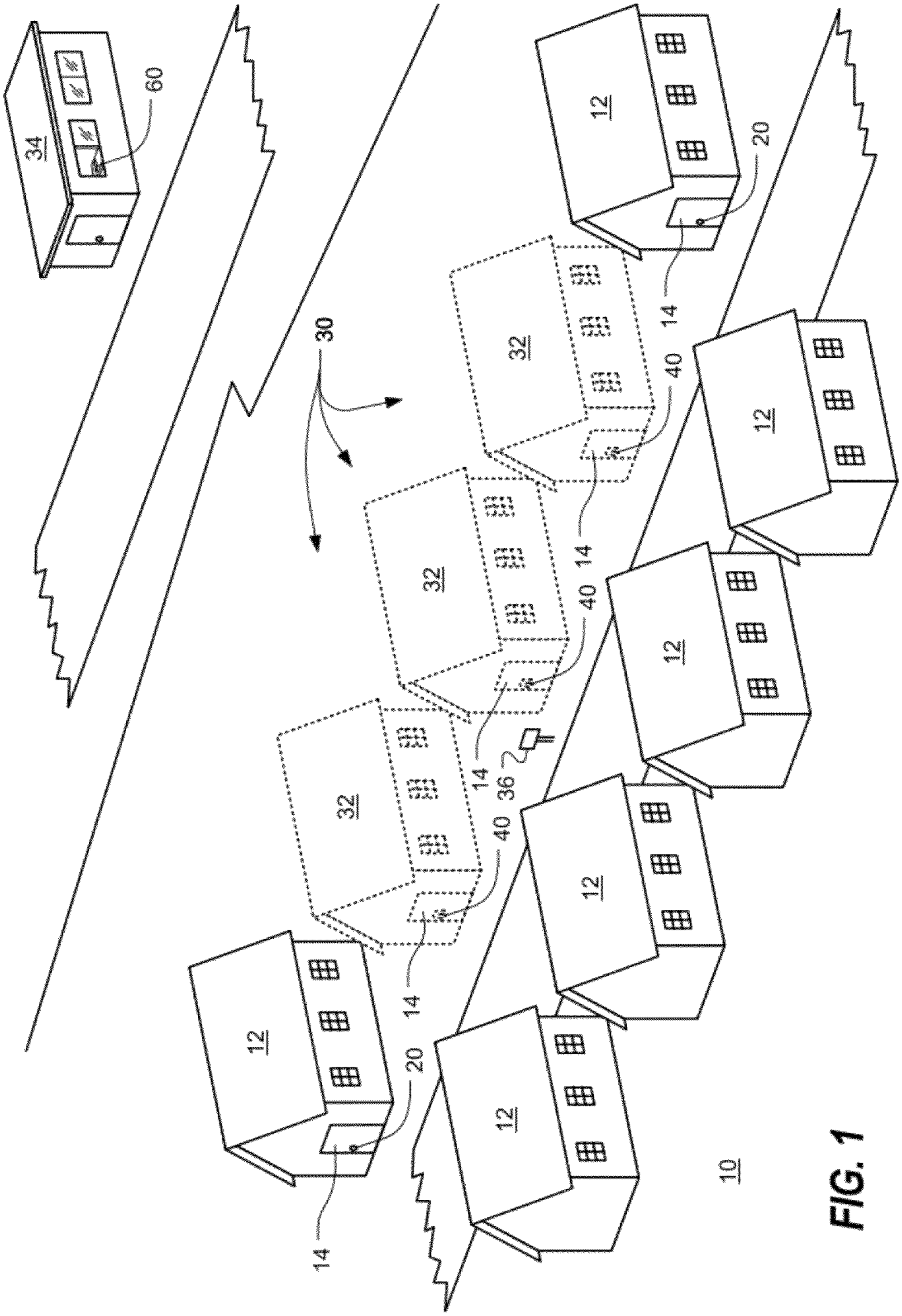
FIG. 1 is a simplified illustration of a suburban neighborhood in which a small infill-type development, consisting of a small number of new houses, is being constructed in between existing houses.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a simplified illustration of a suburban neighborhood 10 in which a small infill-type development 30, consisting of a small number of new houses 32, is being constructed in between existing houses 12. In this simplified illustration, the existing houses 12 utilize conventional locksets 20 on the doors of the houses 12, while the new houses 32 utilize dynamic electronically-controlled locksets 40 in accordance with the preferred embodiments of the present invention.

Figure 2:
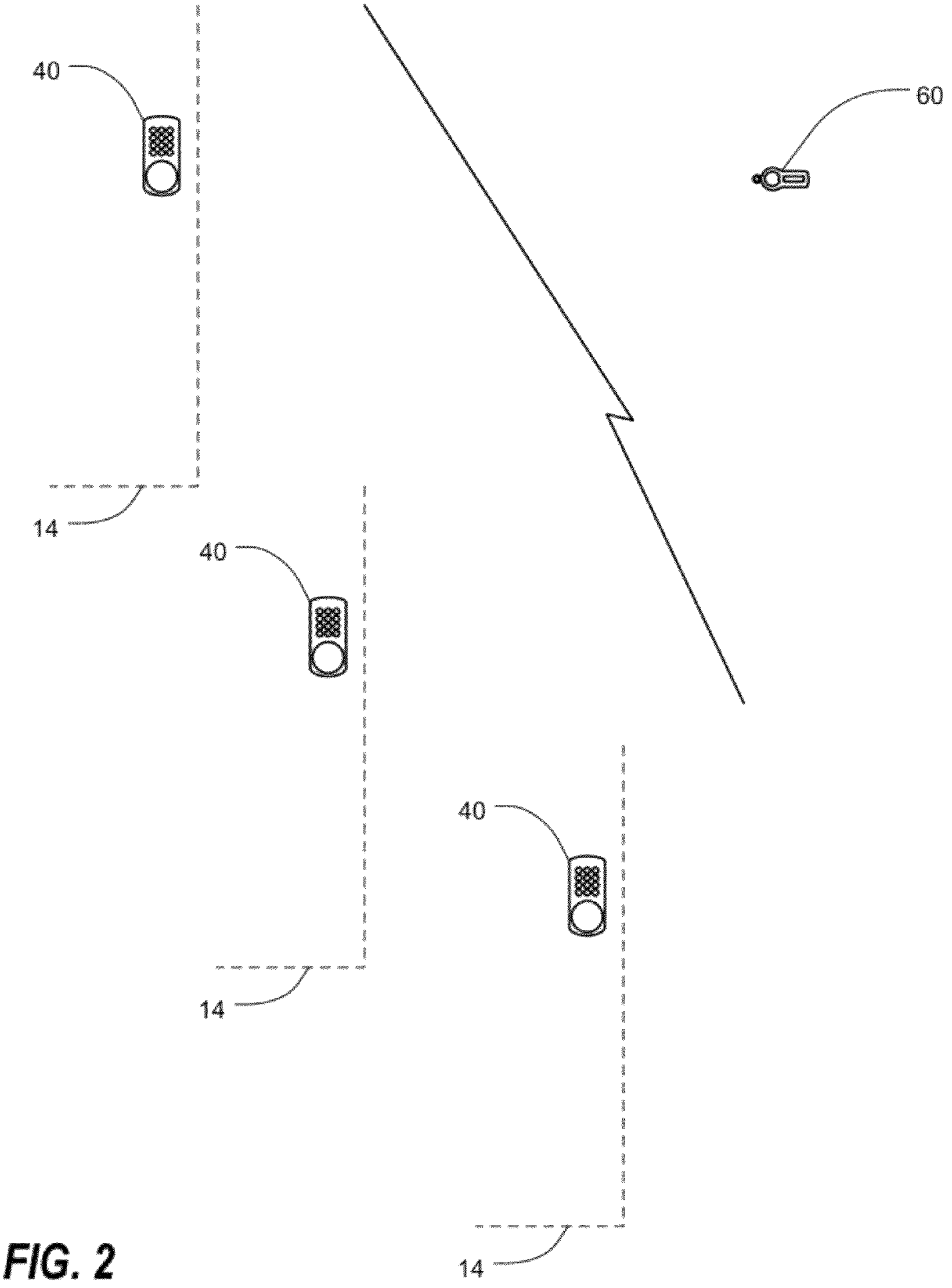
FIG. 2 is a simple block diagram of a dynamic electronic door lock control system in accordance with the preferred embodiments of the present invention.

FIG. 2 is a simple block diagram of a dynamic electronic door lock control system in accordance with a preferred embodiment of the present invention. As shown therein and in FIG. 1, the door lock control system includes one or more dynamic electronically-controlled locksets 40 and at least one reference device 60. In the embodiment shown in FIG. 1, there are, in fact, three such locksets 40 and one reference device 60. However, other embodiments are likewise possible, as further discussed in a subsequent section. In the illustrated application, the dynamic electronically-controlled locksets 40 are intended to be utilized on-site, on the doors of the new houses 32 being constructed, while the reference device or devices 60 are intended to be used remotely, as described in greater detail hereinbelow.

Figure 3:
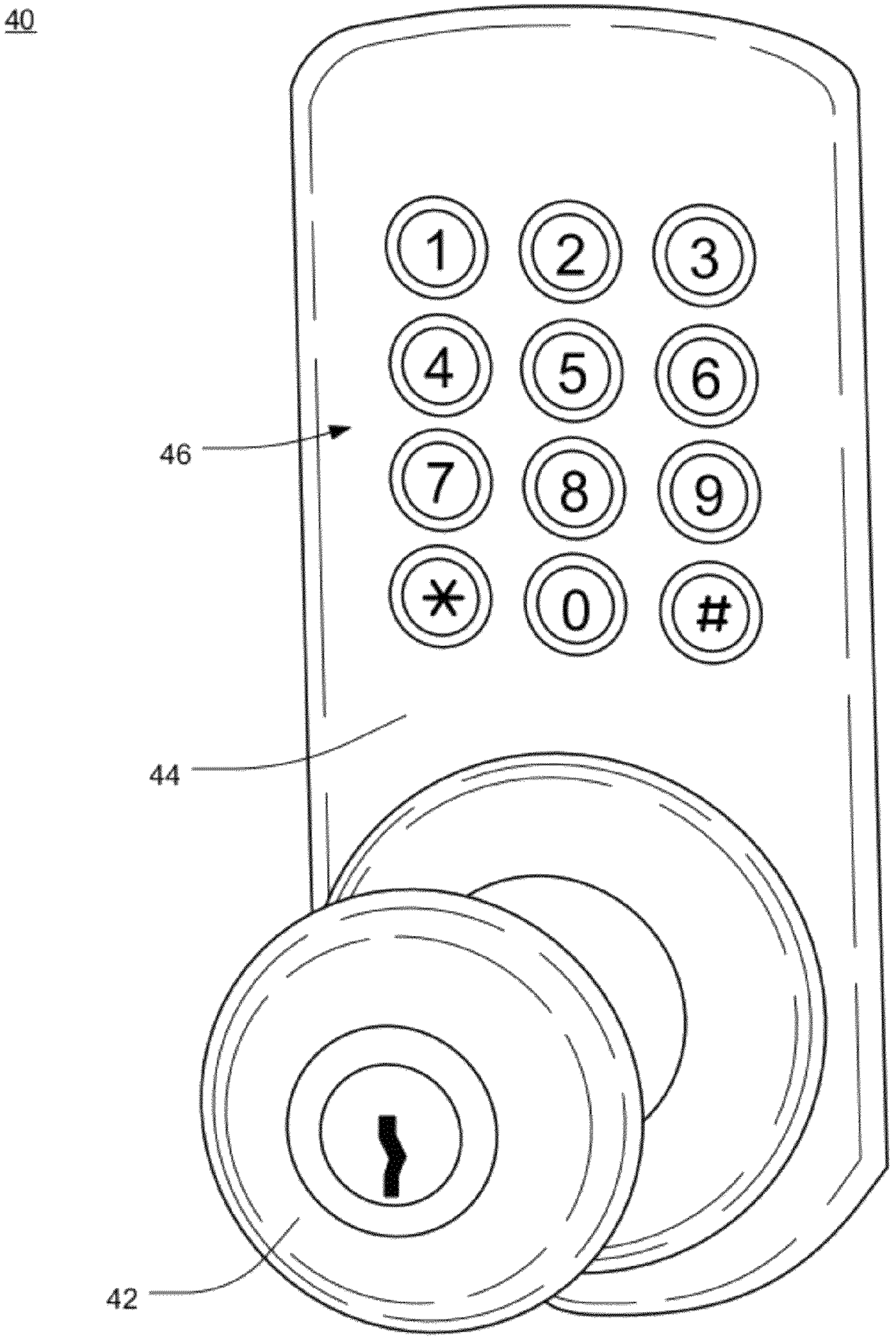
FIG. 3 is a perspective view of the dynamic electronically-controlled lockset of FIG. 2.

FIG. 3 is a perspective view of the dynamic electronically-controlled lockset 40 of FIG. 2. In general appearance, the dynamic electronically-controlled lockset 40 of the present invention may resemble some conventional electronically-controlled locksets, with each having a doorknob 42 carried by a housing 44 that also provides a user input device 46. The doorknob 42, housing 44 and user input device 46 may each be of conventional construction, such as a ten-digit/twelve-button electronic keypad above a keyed door knob on the exterior side of the lockset 40 and a box with a matching knob on the interior side. In various alternative variations, the user input device 46 may utilize mechanical pushbuttons, electronic sensors, or the like and may or may not be protected by a flexible membrane. In still further alternative variations, the user input device 46 may include a greater or lesser number of input keys or buttons or may include a single key that may be manipulated to select from any of a plurality or multiplicity of numbers, letters or characters. Perhaps particularly with regard to the latter variations, an electronic display, such as a series of digits displayed via LED or LCD technology, may further be included. It will be appreciated that all of these variations and any other conventional variations thereof are included within the scope of the present invention.

Notably, and as further explained below, the doorknob 42 and housing 44 each include one or more additional elements not illustrated in FIG. 3, but which are well known to the Ordinary Artisan. Components suitable for use in the lockset 40 of the present invention are offered by a variety of manufacturers, and in particular are offered in the form of the PAKK-01P lockset available from Luminair Products, Inc., dba Keyless Pro, of La Puente, Calif.

Figure 4:
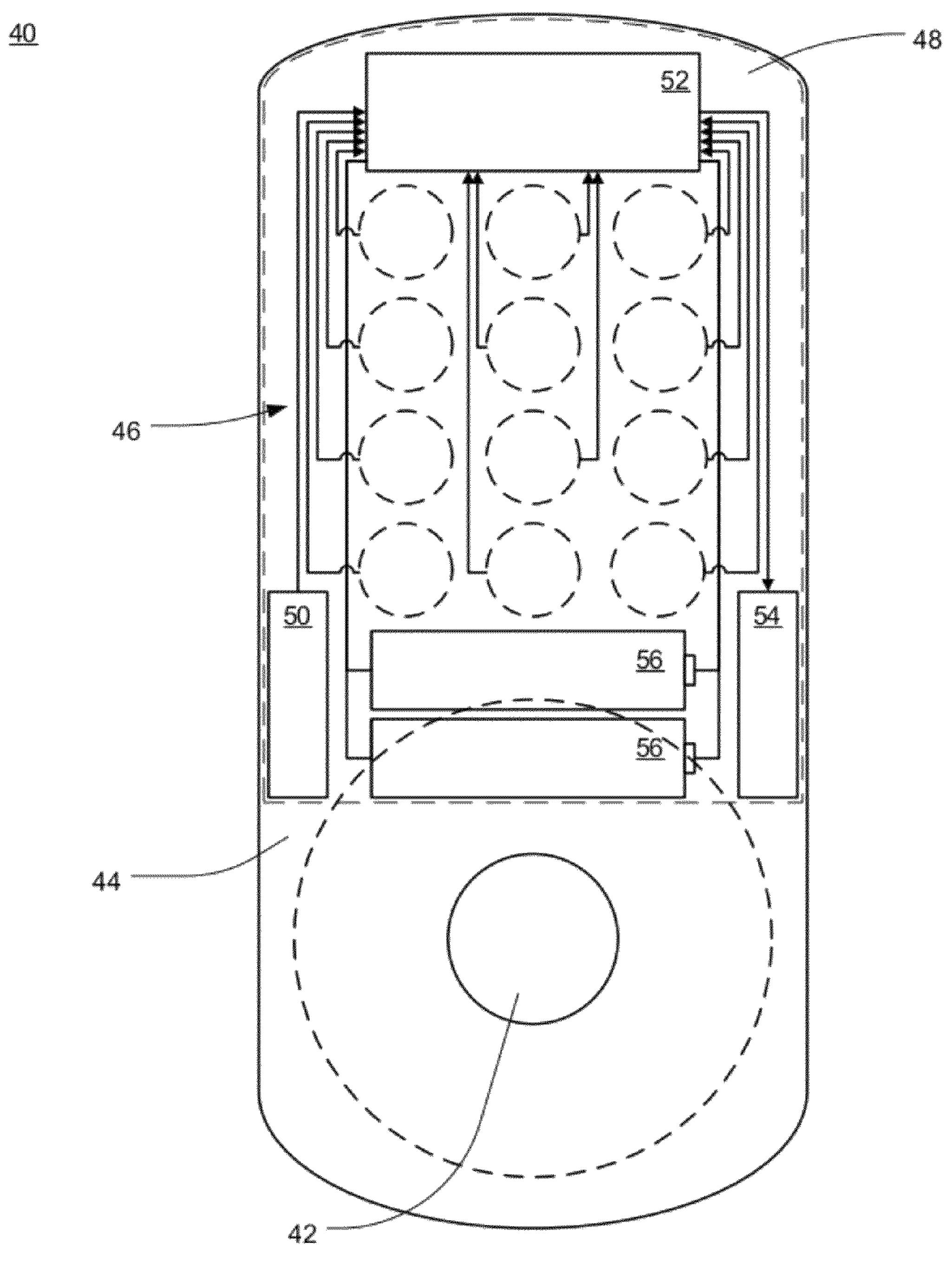
FIG. 4 is a block diagram of the major electronic components of the dynamic electronically-controlled lockset of FIG. 3.

FIG. 4 is a block diagram of the major electronic components of the dynamic electronically-controlled lockset 40 of FIG. 3. Most or all of the major electronic components of the lockset 40 are supported by an electronics assembly 48, and include an interface with the user input device 46, an electronic code module 50, a control module 52, a lock interface 54 and a battery module 56. The electronics assembly 48 may be a simple printed circuit board of conventional construction. The control module 52 is the center of operations for the electronics assembly 48, receiving power from the battery module 56, inputs from the user input device 46 via the interface, and input from the electronic code module 50. Based on the various inputs, the control module 52 outputs one or more control signals to the lock interface 54. The lock interface 54, which may be of conventional design and construction, provides the electromechanical interface to the lock mechanism, thereby translating input representative of an "unlock" instruction to mechanical motion. Such an interface 54 is likewise provided in the PAKK-01P lockset described previously.

The electronic code module 50 provides one or more signals that are input to the control module 52, the one or more signals being representative at any time of the value of a time-based dynamic access code, determined or controlled by the electronic code module 50, that must be independently entered by a user in order to cause the control module 52 to activate the lock interface 54. Notably, code values will generally be described herein as numerical in nature, but it will be appreciated that other types of values, including alphabetic, characters, and the like may likewise be used without departing from the scope of the present invention. It will further be appreciated that various elements of the present invention as described herein may necessarily be changed to accommodate such varying value types, but likewise will be accomplished without departing from the scope of the present invention.

The dynamic access code itself is changed frequently on some predetermined basis, and preferably changes frequently enough such that the same access code is never valid for more than one consecutive entry by a user. Such access codes may be determined or controlled by the electronic code module 50 in more than one way. In a first method of determining or controlling a dynamic access code, a pseudorandom number generator, seeded using one or more predetermined inputs, may be used to create a series of pseudorandom numbers of a desired number of digits, with a resulting output value being provided to the control module 52. This output value is changed on a periodic basis, preferably at a relatively high frequency, such as once every 120 seconds. In a second method of determining or controlling a dynamic access code, a multiplicity of predetermined numbers, each of a desired number of digits, are stored in the electronic code module 50 and output, one at a time, to the control module 52. As in the first method, the resulting output value is changed on a periodic basis, preferably at a relatively high frequency, such as once every 120 seconds.

Other methods of determining or controlling a dynamic access code, and outputting a resulting value on a periodic, relatively high frequency basis, may be known to the Ordinary Artisan. An important characteristic, however, is that the determination or control of the dynamic access code should be carried out in coordination with the operation, described below, of the separate reference device 60. Such coordination may be achieved by reproducing, at the reference device 60, the method the electronic code module 50 uses to determine or control the dynamic access code that may be reproduced by the reference device 60, by using a conventional wireless communication method to transmit the dynamic access code that is determined or controlled from one of the devices 60,50 to the other, or by other methods or technologies known to the Ordinary Artisan. In one algorithmic approach suitable for use in the present invention, the electronic code module 50 uses as inputs the year, month, hour and minute from an internal clock and a three-digit value unique to the lockset 40 and generates a 4-digit output value using conventional logical operations, such as shifts, rotates, ANDs, ORs, XORs and the like. Assuming the three-digit lockset value is known to the reference device 60 and the internal clock of the electronic code module 50 is synchronized with an internal clock in the reference device 60, or the equivalent thereof, determination of the 4-digit output value may be easily duplicated by the reference device 60.

Optionally, the control module 52 may be of generally conventional construction except that the value of the valid access code is provided by the electronic code module 50, and that value changes on a periodic, relatively high frequency basis. Otherwise, the control module 52 may be of the type wherein the access code at any time is a constant, non-changing (static) access code that is stored in the control module 52 or in a connected storage device. The control module 52 receives a steady stream of ever-changing access code values from the electronic code module 50. As each new access code value is received by the control module 52, it is stored in a specific register, with the access code value that is stored in the register at any given time being understood to be the current access code value. Alternatively, the electronic code module 50 may generate a steady stream of ever-changing access code values but may provide a current value to the control module 52 only upon request, and which, upon receipt, is stored in the specific register as the current access code value. In each case, the access code value stored in the specific register remains the current access code value until it is replaced with a new access code value.

Meanwhile, the control module 52 may, at any time, receive a user input value via the interface with the user input device 46. In other words, a user may, at any time, input a numeric value via the user input device 46, and the entered value may be provided as an input to the control module 52. The control module 52 compares the user input value, as received from the user input device 46, with the value of the current access code value, as received from the electronic code module 50 and stored in the current access code register. If the user input value matches the current access code value, then the control module 52 sends one or more control signals to the lock interface 54, instructing the lock interface 54 to cause the lock to be unlocked. On the other hand, if the user input value does not match the current access code value, then the lock interface 54 is effectively instructed, either explicitly or implicitly, to maintain the lock in a locked state.

Although the electronic code module 50 may provide the current access code value to the control module 52 on the periodic, relatively high frequency basis as described above, the electronic code module 50 does not display or otherwise provide the current access code value directly to the user. Indeed, the electronic code module 50 preferably has no means for displaying or otherwise providing the current access code value directly to a user. Moreover, although the control module 52 or user input device 46 may be connected to a display or other user interface (not shown), such display or the like does not show or otherwise indicate the current access code value directly to the user.

Figure 5:
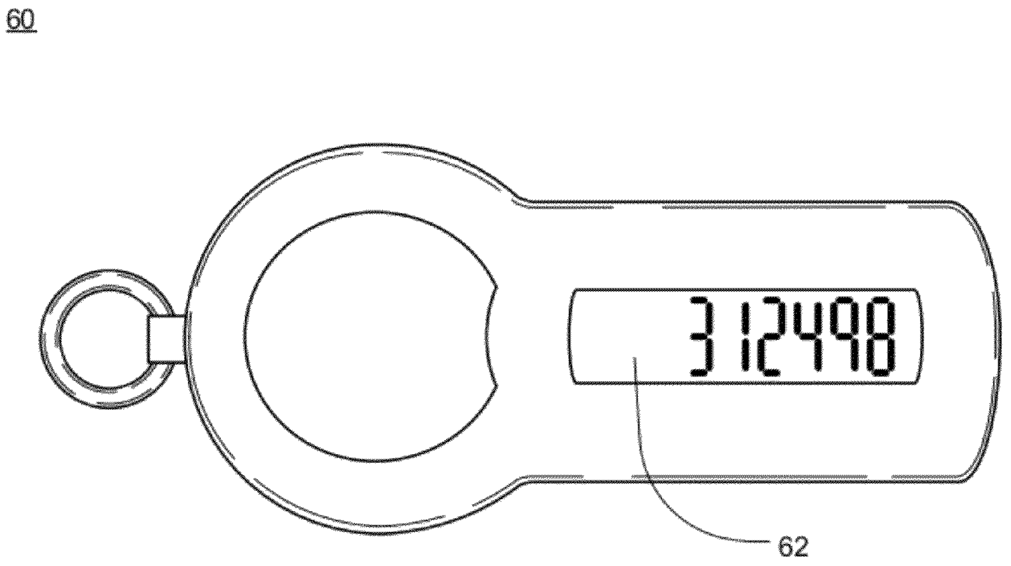
FIG. 5 is a front view of the reference device of FIG. 2.

Instead, the current access code value is displayed or presented by the separate reference device 60, which in a preferred method of use is generally located remotely from the lockset or locksets 40. Referring again to FIG. 1, such a separate reference device 60 may be kept in a remote location such as a real estate office 34, but it will be apparent that the device 60 may instead be carried by a real estate agent or other authorized user for one or more purposes described hereinbelow. FIG. 5 is a front view of the reference device 60 of FIG. 2. As shown therein, the reference device 60 may be small in size, to make it easy to carry on one's person, and includes a digital display 62 for visually presenting a numeric value to a user. Although not illustrated, the reference device 60 also includes internal circuitry for generating or controlling the numeric value that is presented to the user on the digital display 62. A reference device 60 suitable for use in the preferred embodiments of the present invention may be available from, or developed using technology available from, RSA Security Inc. of Bedford, Mass.

Although not shown, it will be appreciated by the Ordinary Artisan that the reference device 60 need not be a dedicated, special-purpose device but may be, for example, a personal digital assistant ("PDA"), personal computer ("PC"), telecommunications device, or the like. Indeed, different types of reference devices 60 may be used in a single system implementing one or more embodiments of the present invention.

Importantly, the internal circuitry of the reference device 60 uses the same method of determining or controlling the numeric value that the electronic code module 50 does to determine or control the dynamic access code. That is, if the electronic code module 50 uses a pseudorandom number generator, seeded using one or more predetermined inputs, to create a series of pseudorandom numbers that are sequentially output as the dynamic access code, then the reference device 60 also uses a pseudorandom number generator, seeded using the same one or more predetermined inputs, to create the same series of pseudorandom numbers. Similarly, if a multiplicity of predetermined numbers, each of a desired number of digits, are stored in the electronic code module 50 for sequential output, one at a time, to the control module 50, then the reference device 60 uses the same set of predetermined numbers and outputs them in the same sequence. Further, the reference device 60 is synchronized with the electronic code module 50 such that the same numeric value is produced and output, to the digital display 62 and the control module 52, respectively, at the same time, thereby ensuring that the numeric value that is visually presented to the user on the digital display 62 is identical to the current value of the dynamic access code. Thus, a user who is aware of the numeric value that is presented on the digital display 62 of the reference device 60 at any given moment may input that value into the control module 52, via the user input device 46, in order to cause the lockset 40 to be unlocked.

As described previously, in one algorithmic approach suitable for use in the present invention, the electronic code module 50 uses as inputs the year, month, hour and minute from an internal clock and the three-digit value unique to a particular lockset 40 and generates a 4-digit output value using conventional logical operations, such as shifts, rotates, ANDs, ORs, XORs and the like. Assuming the internal clock in the reference device 60 is synchronized with the internal clock of the electronic code module 50, or the equivalent thereof, the determination of the 4-digit output value generated by the electronic code module 50 may be easily accomplished by the reference device 60.

In at least some embodiments of the present invention, variations in internal clock values and lag times in reading and inputting code values may be addressed by keeping track, in the electronic code module 50, of three successive code values, wherein if a user enters any of the three code values, the lockset 40 is unlocked. Preferably, the middle value of the three successive values is considered to be "current" and is synchronized as accurately as possible with the operation of the reference device 60 and the current code value provided thereby. However, if the code value provided by the reference device 60 leads or lags the same value being considered current in the electronic code module 50, it may still be used to unlock the lockset 40 if it is entered just before or after it becomes the "current" value in the electronic code module 50. Thus, a user who accidentally delays entering the code provided by a listing agent, as described below, may still be granted access without the synchronization between the reference device 60 and the electronic code module 50 being precise. Internal clocks that are accurate to +/− one second per month should be sufficient, particularly when coupled with means for manually adjusting the clock value as necessary.

In a typical implementation of the present invention, a builder undertakes the process of constructing and selling a small number of houses 32 in a type of development often referred to as an "infill" development or project 30. Because so few houses 32 are involved, it is often not cost-effective to hire an onsite real estate agent to greet potential buyers, give them information about the house or houses 32, and authorize them to tour the home interiors. Instead, the builder commonly hires or contracts for a "listing" or "showing" agent who is stationed offsite but is available to meet potential buyers or to talk to them via telephone or other communication means. The builder installs an electronically-controlled lockset 40 of the present invention on an exterior door 14 of each house 32, and provides the listing agent with a reference device 60 that is synchronized with the various locksets 40. The lockset 40 may be installed directly onto or into, for example, the front door 14 of the house 32, using the conventionally drilled hole that is already intended for a lockset 20. The builder may choose to use either the building-in-process door or the finished decorative door, each of which is well known to the Ordinary Artisan. Finally, the builder or the listing agent preferably installs a sign 36 or otherwise provides information that may be used by potential buyers to learn how to contact the listing agent to discuss and possibly tour one or more of the houses 32.

It will be appreciated that a single reference device 60 may be synchronized or otherwise coordinated with a plurality of locksets 40 in more than one way. In a first arrangement, the various locksets 40 are synchronized with each other and with the single reference device 60 such that the same numeric value is produced and output to each respective control module 52, and to the digital display 62 of the reference device 60, at the same time, thereby ensuring that the numeric value that is visually presented to the user on the digital display 62 is substantially always identical to the current value of the dynamic access code in each lockset 40. Thus, a user who is aware of the numeric value that is presented on the digital display 62 of the reference device 60 at any given moment may input that value into the control module 52 of any of the locksets, via the respective user input device 46, in order to cause the lockset 40 to be unlocked.

In another arrangement, however, the various locksets 40 are synchronized with a single reference device but are not synchronized with each other. Instead, a multiplexing reference device (not shown) includes internal circuitry for generating or controlling a different series of numeric values that may be presented, one at a time or more than one at a time, to a user on a digital display of the multiplexing reference device. The multiplexing reference device also provides means, such as one or more user inputs or one or more additional display elements, for determining, controlling or otherwise associating each numeric value presented on the digital display with a corresponding, synchronized lockset 40 of the plurality of locksets 40. Thus, the multiplexing reference device is capable of presenting to the user, via the digital display, the current value of any of the dynamic access code for any of the plurality of locksets 40, and is capable of doing so in a manner which associates each dynamic access code displayed with the lockset 40 to which it corresponds. This arrangement provides additional security in that each lockset 40 may be seeded with a different number (for an electronic code module 50 using a pseudorandom generator) or provided with a different set of predetermined numbers (for an electronic code module 50 storing and supplying numbers from such a multiplicity of stored numbers), but with which a single reference device may be utilized. The underlying technology for a multiplexing reference device suitable for use in the preferred embodiments of the present invention may be available from, or developed using technology available from, RSA Security Inc. of Bedford, Mass. It will also be apparent that other arrangements may also be utilized to accomplish the same function described in these two arrangements.

Regardless of the arrangement of the above-described or referenced arrangements that is used, a potential buyer thereafter arrives at the development 30 and is or becomes interested in touring the interior portions of one or more of the houses 32. The buyer may be, but is frequently not, accompanied by an agent, to whom the buyer may or may not be contractually bound. Using the contact information provided on the sign 36, the buyer (or if accompanied, the buyer's agent) may establish communication with the listing agent. The listing agent may answer the buyer's or his agent's questions about any of the houses 32, and if the buyer or buyer's agent expresses interest in a tour, the listing agent may vet or screen the buyer using any desired qualification procedure. The qualification procedure may involve a formal qualification process, established in advance and well known to the listing agent or the listing agent's personnel. The qualification procedure may further include input from, or be approved by, the builder.

Once the buyer (or buyer's agent) has passed whatever criteria are established in the qualification procedure, the listing agent locates the reference device 60 (or multiplexing reference device) corresponding to the lockset 40 for the selected house 32, views the numeric value that is presented on the digital display 62 of the reference device 60 at any given moment and provides it to the buyer (or buyer's agent) via the communication method that has been established. The buyer may then promptly input that value into the control module 52, via the user input device 46, in order to cause the lockset 40 to be unlocked. If the communication method being used permits verbal communication, the listing agent can stay on the phone to give the buyer a verbal tour. Alternatively, or subsequently, the listing agent may halt communications and reinitiate them later in order to receive feedback.

Most preferably, the lockset 40 relocks automatically upon closing or after a predetermined period of time. The relocking feature preferably prohibits the buyer from taking a second look at the house 32 without contacting the listing agent again for another code. Thus, no physical key is required to relock the lockset 40, thereby minimizing or eliminating the possibility of a key being misplaced or stolen and the nightmares thus created for the builder.

Figure 6:
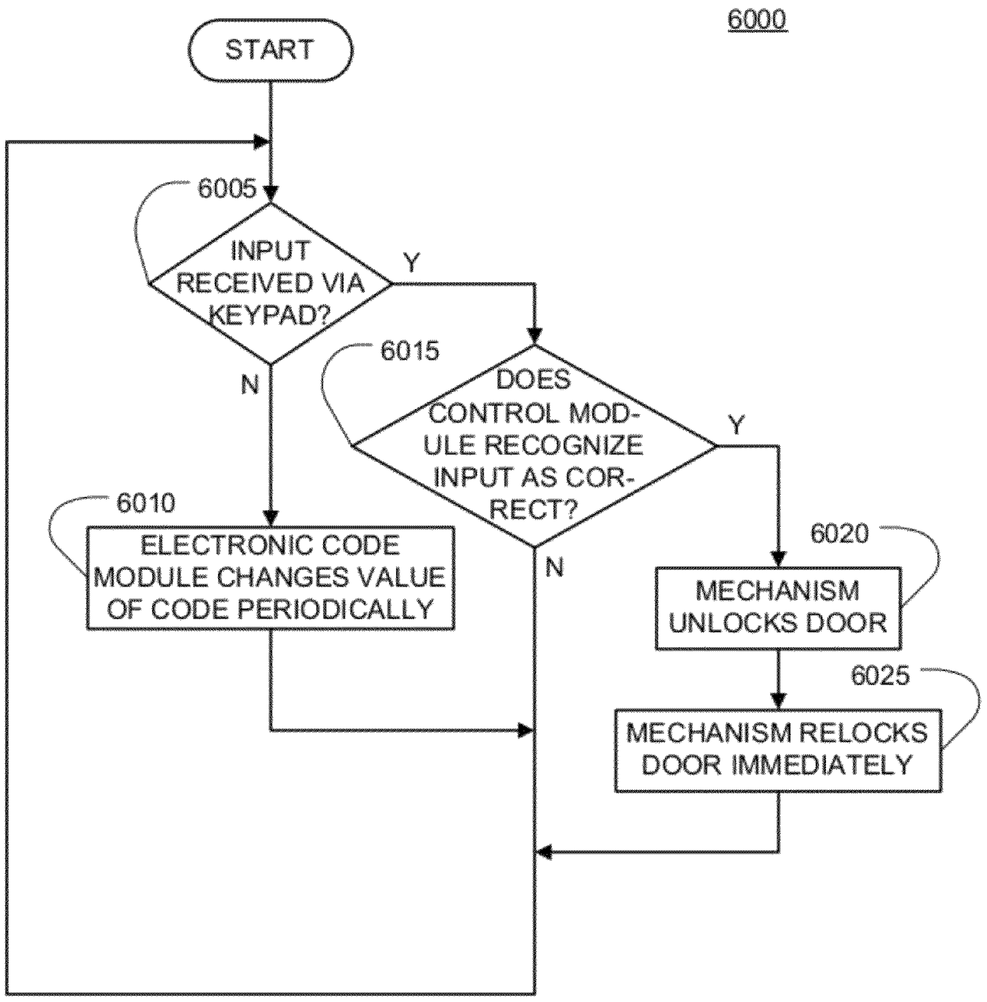
FIG. 6 is a simplified flowchart diagram illustrating steps of the process generally carried out by each lockset.
Figure 7:
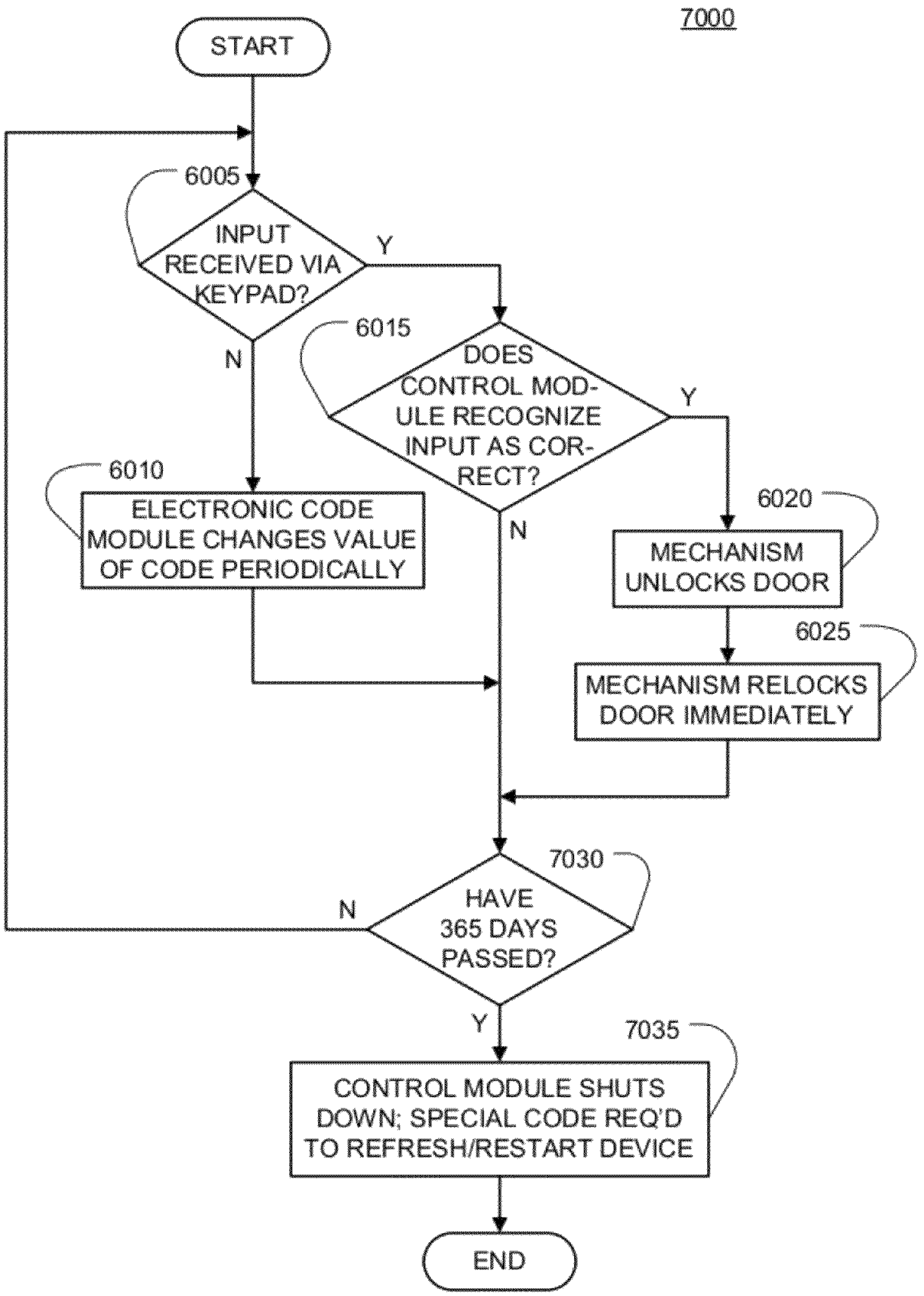
FIG. 7 is a simplified flowchart diagram illustrating steps of an alternative process generally carried out by each lockset.
Figure 8:
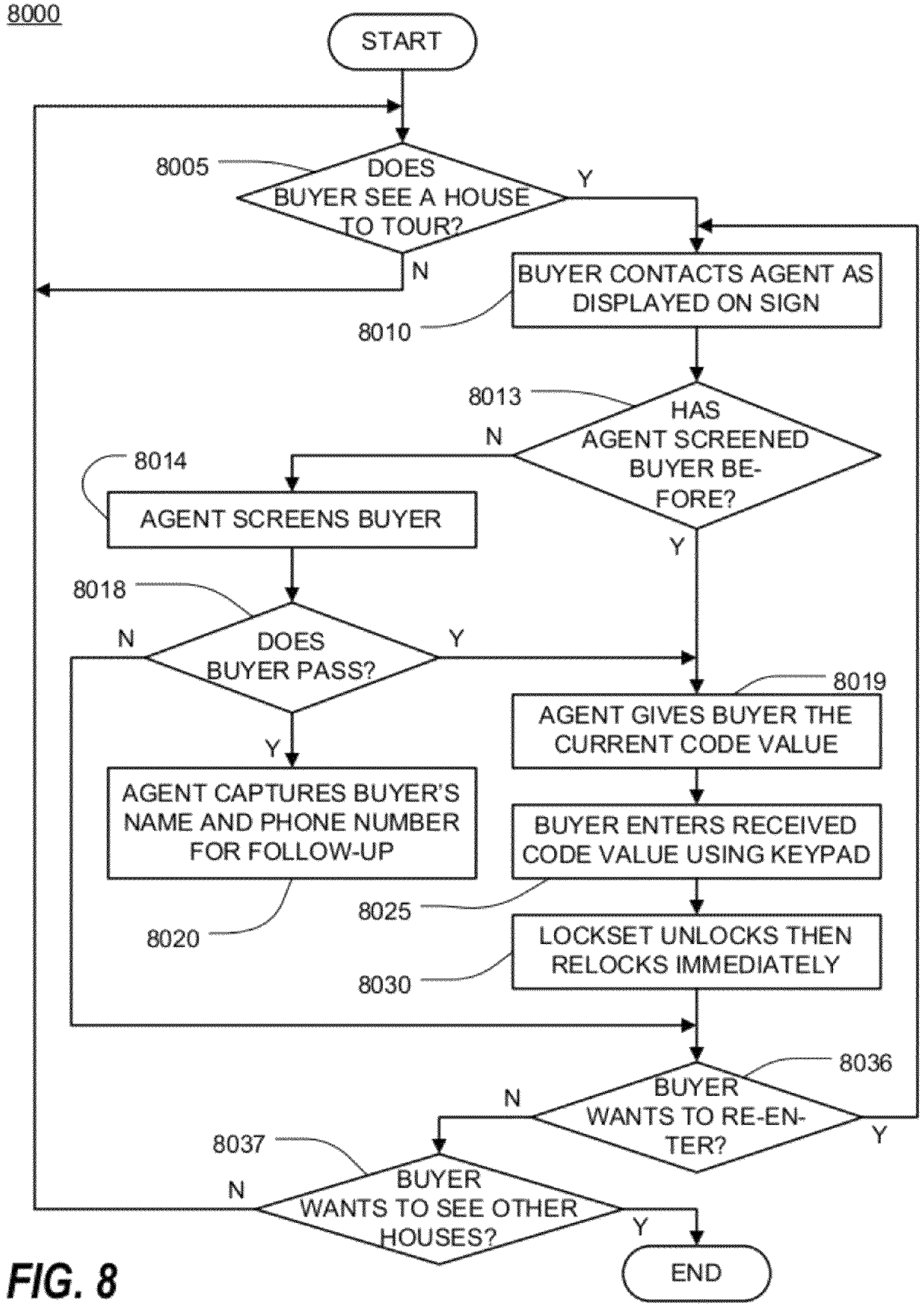
FIG. 8 is a very simplified flowchart diagram of the steps of a process carried out by users in using the lock control system.

The operation of the dynamic electronic door lock control system is illustrated in FIGS. 6, 7 and 8. FIG. 6 is a simplified flowchart diagram illustrating steps of a process 6000 generally carried out by each lockset 40, FIG. 7 is a simplified flowchart diagram illustrating steps of an alternative process 7000 generally carried out by each lockset, and FIG. 8 is a very simplified flowchart diagram of the steps of a process 8000 carried out by users in using the lock control system. Referring first to FIG. 6, the control module 52 may operate in a software loop wherein it awaits, at step 6005, the receipt of a code value entered by a user via the user input device 46. If at step 6005 the control module 52 determines that the user input device 46 has received an entry, then at step 6015 it determines whether the value input via the user input device 46 matches the current value of the code as provided by the electronic code module 50. If so, then at step 6020 the lock interface 54 causes the lock mechanism to unlock the door 14. Furthermore, at step 6025, the lock mechanism relocks the door 14 immediately, and processing may loop back to the beginning again. On the other hand, so long as no user-input code value is detected at step 6005, the control module 52 continues to idle, except that as shown at step 6010, the electronic code module 50 provides the control module 52 with a new value for the code on a periodic, relatively high frequency basis, which in at least some embodiments is 120 seconds.

As shown in FIG. 7, an additional security and/or reliability function may optionally be provided in an alternative process 7000 as shown at steps 7030 and 7035. Specifically, the control module 52 keeps track of how long it has been in operation and, if a predetermined period of time has elapsed, then the control module 52 shuts down normal operation of the lockset 40. Preferably, a special code is then required to reinitiate normal operation. It will be apparent that the length of time, which in the illustrated process 7000 is shown to be 365 days, may be varied as desired, and in fact the lockset 40 may be designed to permit the user to manually adjust the length of time as desired. This feature may be utilized to provide additional control over the ongoing use of the system, examples of such control being described hereinbelow. In particular, this feature prevents unauthorized use of the system by halting operation of the lockset 40 after the specified period of time has elapsed. Although not shown, means is preferably further provided for reactivating the lockset 40 if desired. In at least some embodiments of this implementation, the reference device 60 (and any other locksets 40 being used therewith) may continue to work.

On the other hand, a function similar to that provided by steps 7030 and 7035 (i.e., the ability to prevent unauthorized use of the system after the specified period of time has elapsed) may alternatively, and perhaps preferably, be provided by the reference device 60. More particularly, and although not shown, the reference device 60 may keep track of how long it has been in operation and, if a predetermined period of time has elapsed, then normal operation of the reference device 60 is disabled. Preferably, a special code is then required to reinitiate normal operation. If the reference device 60 does not have a user input device, then it may be necessary to transmit the code to the device 60 wirelessly, or to replace the reference device 60 with a new unit. It will be apparent that the length of time, which may, for example, be 365 days, may be varied as desired, and in fact the reference device 60 may be designed to permit the user to manually adjust the length of time as desired. As with the feature described with regard to FIG. 7, this feature may be utilized to provide additional control over the ongoing use of the system, examples of such control being described hereinbelow. In particular, this feature prevents unauthorized use of the system by halting operation of the reference device 60 after the specified period of time has elapsed. Although not shown, means is preferably further provided for reactivating the reference device 60 if desired. In at least some embodiments of this implementation, the various locksets 40 may continue to work.

As described previously, FIG. 8 is a very simplified flowchart diagram of the steps of a process 8000 carried out by users in using the lock control system. As shown therein, the process 8000 begins at step 8005 when a home buyer identifies a particular house 32, equipped with a dynamic electronic door lock control system of the present invention, that the buyer would like to tour. At step 8010, the buyer calls or otherwise contacts the listing agent via the phone number or other contact information displayed on the sign 36. Assuming at step 8013 that the listing agent has not screened the buyer before, then at step 8014 the agent screens the buyer using whatever screening process has been chosen. If, at step 8018, the buyer passes successfully through the process, then the listing agent checks his or her reference device 60 for the current code value presented therein and orally or otherwise manually provides the value to the buyer as shown at step 8019. Separately, the listing agent preferably captures, as represented at step 8020, the information, such as the buyer's name and phone number, that has been gathered during the screening process for future follow-up or other desired action. Meanwhile, as shown at step 8025, the buyer enters the code value provided by the listing agent in the user input device 46, which if done in a timely manner causes the lockset 40 to unlock at step 8030 (and to relock immediately thereafter).

Because the lockset 40 preferably relocks immediately after the buyer enters, and because the dynamic access code for the lockset 40 changes quickly such that the numeric value previously provided by the listing agent would no longer correspond thereto, the buyer must contact the listing agent if at step 8036 the buyer wishes to re-enter the house 32. Because at step 8013 the buyer has already been screened, the agent need only provide the buyer with a new code value as shown at step 8019. It will be appreciated, however, that the agent may choose to query the buyer as to why the buyer needs re-entry and to refuse re-entry in certain circumstances. The screening process may also be omitted if at step 8037 the same buyer wishes to view other houses 32 and identifies a house 32 listed with the same agent. Of course, if the identified house 32 is not listed with the same agent, then at step 8013 the buyer will presumably need to be screened again by the new agent.

The dynamic electronic door lock control system of the present invention may also be used in larger developments, e.g., large new subdivisions having an on-site agent responsible for showing large numbers of newly constructed homes to walk-in prospective buyers. In such an environment, a single agent may be unable to handle all of the customer traffic, and in particular may be unable to both staff a central office and take the time to leave the central office in order to lock and unlock homes for prospective buyers to view. The dynamic electronic door lock control system of the present invention may be implemented in this environment in somewhat similar fashion to that of the small infill development, i.e., by installing an electronically-controlled lockset 40 of the present invention on an exterior door 14 of each house 32 in the development, and provides the listing agent with a reference device 60 that is synchronized with the various locksets 40. Once again, the lockset 40 may be installed directly onto or into, for example, the front door 14 of the house 32, using the conventionally drilled hole that is already intended for a lockset 20, and the builder may choose to use either the building-in-process door or the finished decorative door, each of which is well known to the Ordinary Artisan. Because the development has an on-site agent, and typically a central office in which the agent works, the builder typically has no need to provide prospective buyers with any additional information about the lock control system. Instead, the on-site agent may conduct any desired level of screening, or even no screening whatsoever, before providing the prospective buyer with the value, taken from the reference device 60, that is appropriate to open the door 14 of a selected house 32. Alternatively, because the lockset 40 is preferably self-locking, the agent may choose to accompany the prospective buyer to a selected house 32, consult the reference device 60 for the appropriate value to be used to unlock the lockset 40 and open the door 14, and then leave the prospective buyer alone in the house 32 while the agent returns to the central office. When the buyer finishes viewing the house 32, he or she may simply close the self-locking door 14 behind them, and will be unable to gain access to the house 32 again without contacting the agent for a new value from the reference device 60.

It will be appreciated that although as described herein the locksets 40 are being used only on doors 14 of new houses 32 or houses being renovated, many of the teachings of the present invention are likewise applicable to other situations. The system of the present invention may, for example, be used with other types of residential home sales, such as individual existing home sales of conventional type; with other types of buildings, such as commercial properties; and with other types of transactions, including leases and rentals.

A wide variety of additional applications for the dynamic electronic door lock control system of the present invention are also envisioned. For example, vacation property owners and property management companies are often faced with the problem of distributing keys to their properties to the guests staying in them. Such owners and managers may install and utilize the system to provide guests with initial access to their properties, and may then leave the keys to the properties inside. Upon arrival at the property, the guests may contact the owner or a property manager, as appropriate, to request the then-current value of the access code for the lockset 40. If the guest is unknown to the owner or property manager, then they may choose to use an appropriate screening or qualification procedure to ensure that the guest is authorized to enter the home. If the guest passes the qualification procedure, the owner or property manager looks up, for that property, the numeric value that is presented on the digital display 62 of the reference device 60 at any given moment and provides it to the guest via suitable communications method. The guest may then input that value into the control module 52, via the user input device 46, in order to cause the lockset 40 to be unlocked. Optionally, the owner or property manager may then direct the guest to the location of the keys left in the property and provide the guest with any other appropriate information. Because the access code changes frequently, the guest must subsequently utilize the property keys to access the property or else contact the owner or property manager for assistance.

The dynamic electronic door lock control system of the present invention may also appeal to property owners and property managers who wish to give one-time or limited, non-recurring access to handymen, repairmen, and the like. Suitable properties for such an application may include vacation properties as described above, schools, churches, local government buildings and the like that remain locked much of the time but for which temporary access needs to be provided on an irregular basis. Once again, upon arrival at the property, the authorized visitor may contact the owner or a property manager, as appropriate, to request the then-current value of the access code for the lockset 40. If the visitor is unknown to the owner or property manager, then they may choose to use an appropriate screening or qualification procedure to ensure that the visitor is authorized to enter the home. If the visitor passes the qualification procedure, the owner or property manager looks up, for that property, the numeric value that is presented on the digital display 62 of the reference device 60 at any given moment and provides it to the visitor via suitable communications method. The visitor may then input that value into the control module 52, via the user input device 46, in order to cause the lockset 40 to be unlocked. Because the access code changes frequently, the visitor must contact the owner or property manager for assistance every time he needs to re-enter the building.

Figure 9:
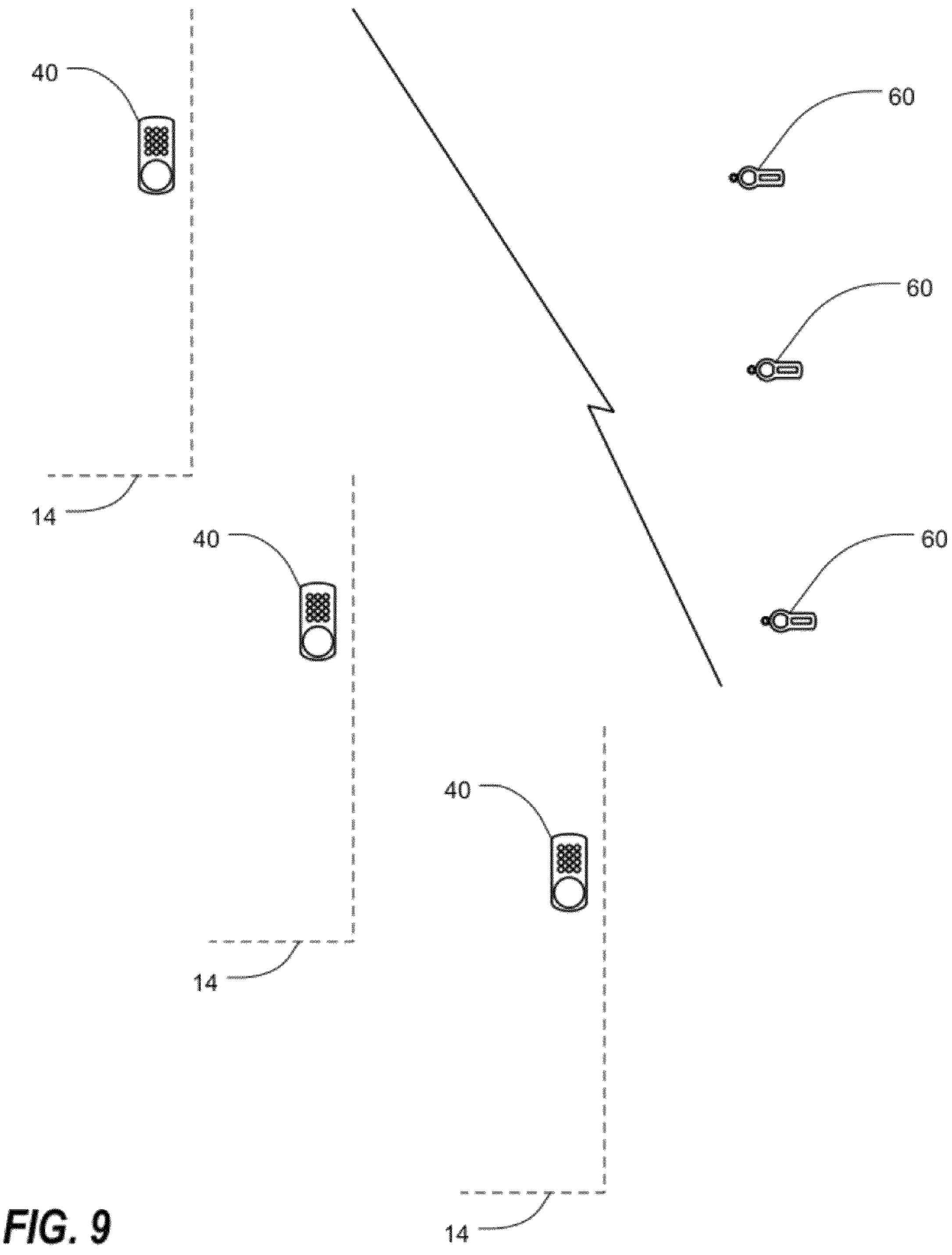
FIG. 9 is a simple block diagram of a dynamic electronic door lock control system in accordance with another preferred embodiment of the present invention.

FIG. 9 is a simple block diagram of a dynamic electronic door lock control system in accordance with another preferred embodiment of the present invention. As shown therein, the door lock control system may alternatively include a plurality of dynamic electronically-controlled locksets 40 and a plurality of reference devices 60. In the illustrated example of this embodiment, there are three electronically-controlled locksets 40 and three reference devices 60, with each reference device 60 being dedicated to a particular lockset 40. The use of separate reference devices 60 may cause greater logistical issues for the listing agent, builder, property manager or owner trying to keep up with all of them, but may result in less confusion for the listing agent about which lockset 40 corresponds to a particular numeric value being displayed by, for example, a multiplexing reference device.

Figure 10:
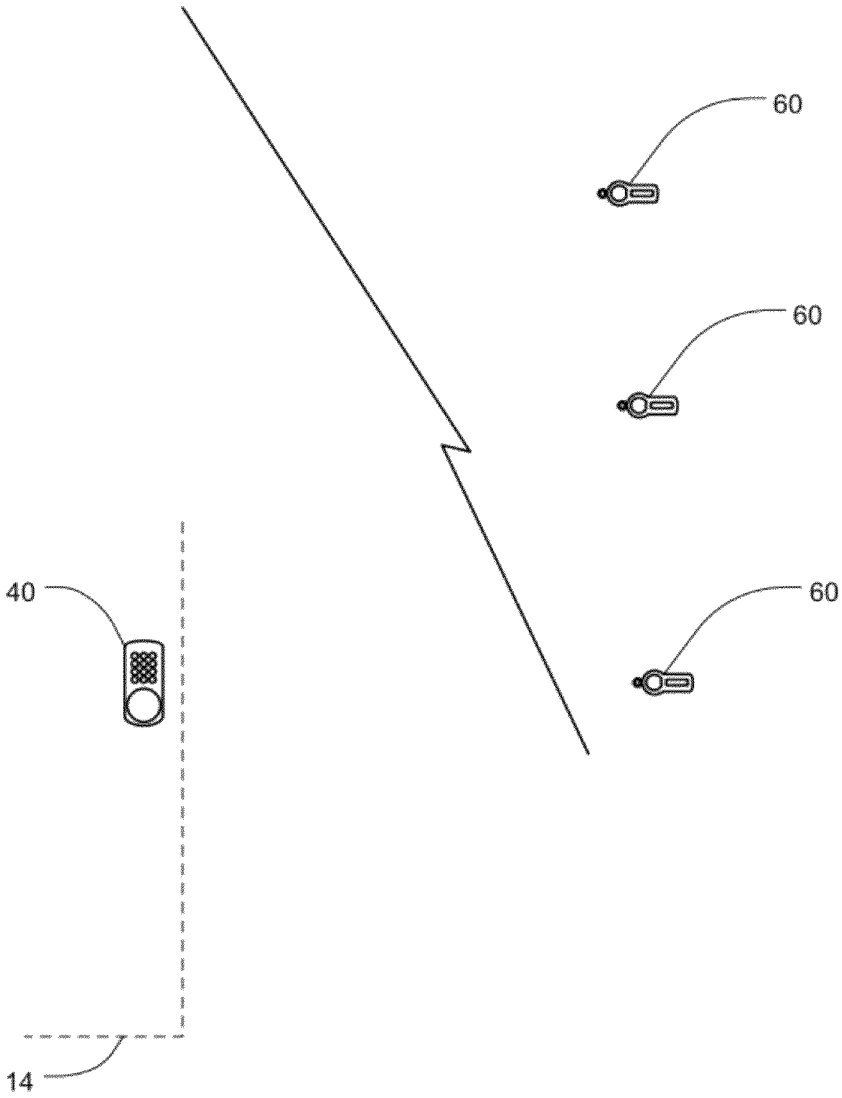
FIG. 10 is a simple block diagram of a dynamic electronic door lock control system in accordance with yet another preferred embodiment of the present invention.

FIG. 10 is a simple block diagram of a dynamic electronic door lock control system in accordance with yet another preferred embodiment of the present invention. As shown therein, the door lock control system may alternatively include a single dynamic electronically-controlled lockset 40 and a plurality of reference devices 60. In the illustrated example of this embodiment, there is one electronically-controlled lockset 40 and three reference devices 60, with each reference device 60 being synchronized with the single lockset 40. This embodiment permits multiple personnel for the listing agent to be able to carry a reference device with them, thereby enabling any of multiple personnel to screen the prospective buyer, buyer's agent, guest or other visitor and to provide such person with the proper code. Such an approach helps minimize the possibility of a buyer being unable to view a house 32 because of the unavailability of the listing agent at the time, or a guest or other visitor being unable to enter a property because of the unavailability of the owner or property manager at the time.

Although not illustrated, it will be apparent that the embodiments shown in FIGS. 2, 9 and 10 may be combined together as desired. For example, each of several personnel for a listing agent may carry a multiplexing reference device that may be used to provide current codes to buyers for any of several locksets 40. Such combinations may also be useful in the other contexts and applications described.

In another aspect of the present invention, a unique business method is proposed in which a single entity may be the exclusive distributor of a lockset product designed and produced according to the above-described teachings. The distributor sells, licenses, franchises or otherwise grants exclusive or non-exclusive rights in and to particular geographic areas, such as zip codes. The zip code rights-holders preferably buy or lease units of the dynamic electronic door lock control system of the present invention from the distributor, contract with builders to allow such rights-holder to list their homes 32 with them, and mount the locksets 40 on the doors of the builders' houses 32 accordingly. Listing agents can use such a method to build and/or secure market share using their rights in the system of the present invention. Other geographic areas to which this approach may be applied include countries, states, counties, cities or other municipalities, telephone area codes, and the like.

Alternatively, of course, one or more entities could be distributors of a lockset product designed and produced according to the above-described teachings, and each distributor could sell or license the product to whomever they wish, with each purchaser/licensee being unrestricted in where the product may be used (i.e., no geographic limitations placed on the product). Listing agents may choose to purchase the product as a marketing advantage as they offer their services to builders or homeowners, or builder or homeowners may purchase the product themselves. With no geographic restrictions in place, a single agent may be able to cover all of a particular builder's needs across every zip code in a city or other geographic area. Moreover, distribution of the product could be limited to agents only, builders only, homeowners only, or any combination of the three, in order to capitalize on additional market benefits and advantages.

In another aspect of the present invention, another unique business method is proposed in which a single distributor licenses use of the system on the basis of a first fee for one part of the system and a second fee for a second part of the system. One of the fees may be a one-time charge, while the other fee may be a recurring one. For example, the distributor/licensor may charge an annual licensing fee for use of a single reference device 60, and further charge a single, one-time cost for each lockset 40 purchased for use with that reference device 60. Such an arrangement could be utilized in the implementation in which all of the locksets 40 that are purchased with the reference device 60 are synchronized to operate together, or the implementation where each lockset 40 operates independently from the others but the reference device 60 is equipped to work separately with all of them. In this arrangement, the locksets 40 may be the purchaser/licensee's to keep, and could be designed to permit ongoing use independent of the reference device 60, but the reference device 60 itself could utilize the feature described previously wherein normal operation of the device 60 is disabled after a predetermined period of time has elapsed. For ease in design and construction and expediency in implementation of this method, it is preferred that the distributor/licensor reference device 60 is merely replaced, rather than updated with a special code or otherwise modified. This may be accomplished by overnight shipping a replacement reference device 60, valid for the following license period, near the end of the current license period (assuming the license fee has been paid, or the distributor/licensor is otherwise satisfied with the agreement and agrees to renew the license).

In a numerical example of the foregoing, a purchaser/licensee may choose to license a single reference device 60 and to order three corresponding locksets 40. At an annual license fee of $1000 per reference device 60 and a one-time cost of $200 per lockset 40, the purchaser/licensee would owe a total of $1000+(3×$200)=$1600 for the first year, and $1000 for each year thereafter that the license is renewed. At the same rates, a purchaser/licensee may choose to license two reference devices 60 and to order six corresponding locksets 40 (three for each reference device 60). This purchaser/licensee would owe a total of (2×$1000)+(6×$200)=$3200 for the first year, and $2000 for each year thereafter that the licenses are renewed. Discounts could be applied for each extra lockset 40 purchased, each extra reference device 60 licensed, or both.

In still another aspect of the present invention, another unique business method is proposed in which the system is used (or licensed for use) by one or more entities in a call center environment. Each such entity distributes locksets 40 to agents, builders, homeowners, or any combination of the three, and also establishes one or more call centers that are equipped with the reference devices 60 corresponding to the various locksets 40. Each call center may handle requests for access to properties that are owned or controlled by multiple different entities. For example, the entity controlling the call center may contract with various builders to handle property access requests for all of their respective locksets 40. Thus, the entity controlling the call center is separate from the entity that owns, builds, manages or lists the properties themselves. Call center services may be offered to builders, real agents, property managers, property owners, and the like. Revenues may be generated through the sale of locksets 40, license fees based on locksets 40, license fees from reference devices 60, license fees based on number of properties handled, license fees from number of property accesses granted, commissions from home sales, license fees for setting up call centers, and a variety of other measures. Further, although not shown herein, the functionality of the reference devices 60 may be replaced in such call centers by an integrated system that may track code values for large numbers of locksets 40 and may display information about each lockset 40 upon request. Such an integrated system may further include a variety of additional software and hardware features such as call tracking, report generation, grouping by entity, historical access information, screening information, an interface to the MLS system and/or to an agents website or other information, and many other types of data.

Figure 11:
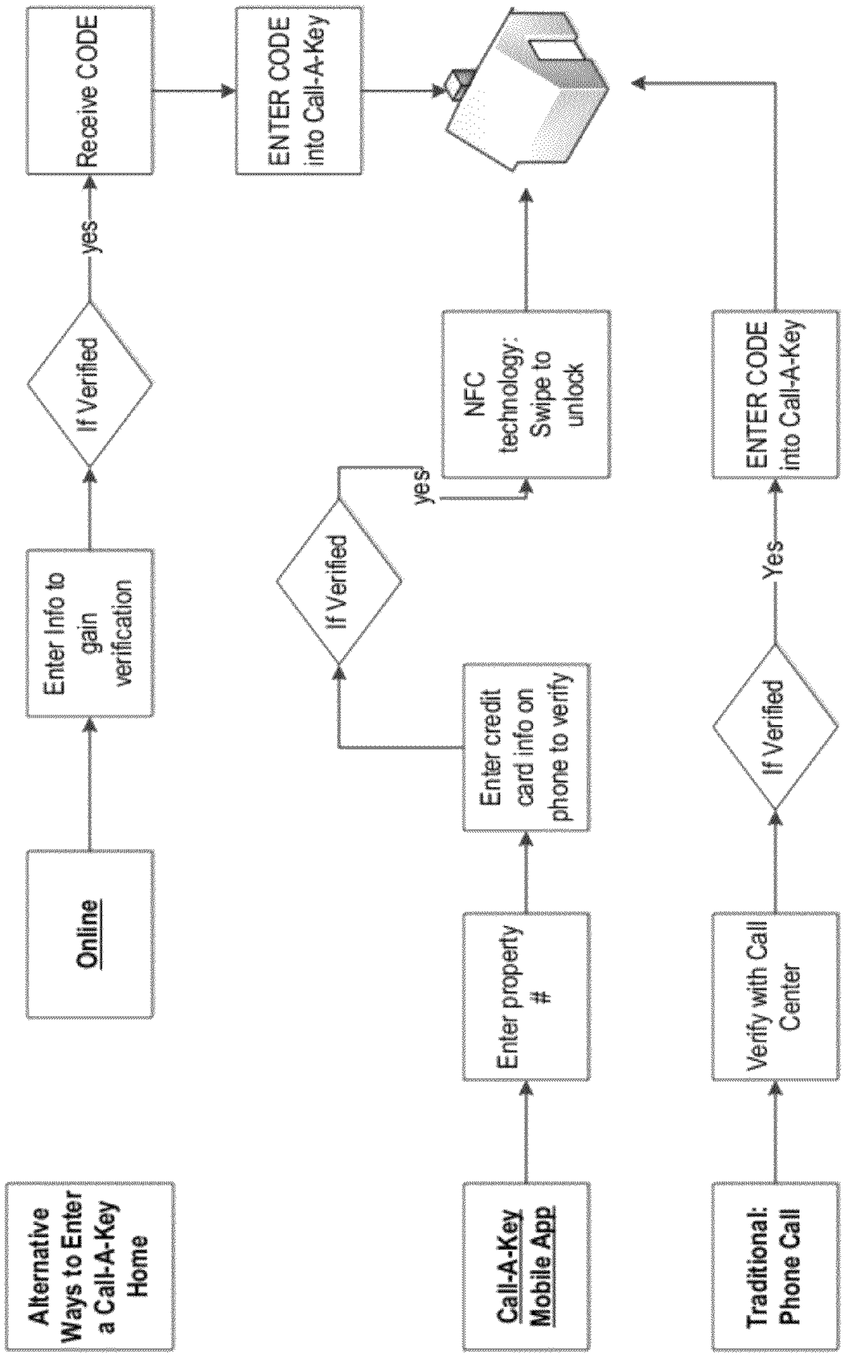
FIG. 11 is a set of simplified flowchart diagrams illustrating different approaches for operation of an electronically-controlled lockset.

It will be appreciated that a variety of dynamic electronic door lock control systems and/or methods may be offered. For example, as shown in FIG. 11, a "traditional" method, described hereinabove, is when a customer drives up to a home 12,32 enabled with a lockset 40 and gains instant access by calling the call center phone number, which is preferably found on the signage. Once the caller's identity is verified, for example through a series of questions, a code (typically four-digits) is given to the prospective buyer to punch into the lockset 40 to make it operable. The caller may be encouraged to stay on the line and tour the home with the call center rep.

In another approach, in accordance with other preferred embodiments of the present invention, a smart phone (or other intelligent mobile device) and a mobile application may be utilized to provide access to a home. In one such method, a method starts with a prospective buyer opening a mobile application on his or her phone when they arrive at the house 12,32 equipped with the technology. They enter the property number into the application and then are prompted to verify their identity. The identity verification process offered by the application may be automated. They can either choose the call center verification approach, such as the one described above, or verify using their credit card information stored locally on the phone. In some embodiments, at least some of the verification process may be executed ahead of time, so that once initially verified, the user needs only to enter a passcode, answer a secret question, provide other identifying information, or the like without having to go back through the entire verification process. Once verified (or re-verified), the prospective buyer or other user may be provided access to the core functions of the mobile application. In particular, once the property number (or other property identification information) is entered into the application, the user may receive the access code on the screen of the smart phone. The user may then enter the access code into the lock to gain access to the home, as described previously.

In still another approach, in accordance with other preferred embodiments of the present invention, a smart phone (or other intelligent mobile device) and a mobile application may be utilized with an alternative lockset enabled with suitable communication protocols, such as near field communications (NFC) protocol, in order to provide access to a home. One such method starts with a prospective buyer opening a mobile application on his or her phone when they arrive at the house 12,32 equipped with the technology. They enter the property number into the application and then are prompted to verify their identity, as described in the preceding paragraph, and once verified (or re-verified), the prospective buyer or other user may be provided access to the core functions of the mobile application, also as described previously. In particular, once the property number (or other property identification information) is entered into the application, the prospective buyer or other user may swipe their smart phone to gain access into the house 12,32. The swipe delivers the code to the phone and the prospect transfers/punches it into the lock, or the swipe itself causes the lock to unlock. The code may or may not appear on the screen of the smart phone in conjunction with this operation. NFC technology suitable for use in this and other preferred embodiments of the present invention are described in U.S. Pat. No. 7,706,778 to Lowe, issued Apr. 27, 2010 and titled "SYSTEM AND METHOD FOR REMOTELY ASSIGNING AND REVOKING ACCESS CREDENTIALS USING A NEAAR FIELD COMMUNICATION EQUIPPED MOBILE PHONE," the entirety of which is incorporated herein by reference.

In another approach, in accordance with still other preferred embodiments of the present invention, a website is provided and may be accessed by a prospective buyer. The website may be a conventional real estate website offered by a developer, individual real estate agent, real estate agency, or the like, or may be a specialized website offered by a proprietor of the technology described herein. The website may list properties for sale and identify those which feature the present technology, may provide a specific list of those properties which feature the present technology, or both. When a prospective buyer or their agent accesses the website and selects one or more properties enabled with the present technology for viewing, they have the option of verifying their identify online. By verifying online, the agent or prospective buyer will hasten the process of the traditional method. Once at the door, the agent or buyer need only to enter a passcode, answer a secret question, provide other identifying information, or the like in order to receive the access code. Besides the code, the site could also provide driving directions and house details for prospects.

If the website is being accessed from a mobile device, such that the access code may be immediately entered into a lockset such as the lockset 40 described previously, then the systems and methods described previously may be utilized. Alternatively, the access code may be a pre-determined, one-time use code. In some embodiments, the same code may be utilized with multiple different houses 12,32. In some of these embodiments, a "tour" of houses 12,32 equipped with the present technology may be established, and the same code could be used with all of the houses 12,32 in the tour.

In another embodiment, in accordance with still other preferred embodiments of the present invention, a smart phone (or other intelligent mobile device) and a mobile application may be used to offer a prospective buyer or other user a list of additional properties equipped with technology of the present invention. The additional properties included in such a list may be limited to properties offered by a particular realtor, properties offered by a particular real estate company, properties offered by a particular builder, properties offered by a particular developer, properties equipped with technology of the present invention under the authority of an owner or licensee of such technology, or any other suitable collection of properties. Furthermore, the application may incorporate geographical location information such that the list of properties is limited to nearby properties. In at least some of these embodiments, information about several such nearby properties may be downloaded, texted, or the like to the device (or, in some embodiments, to one or more other designated devices). Such information may include, but is not limited to, directions, map location, tour information (i.e., a recommended order in which to see the properties), simple address information, and the like. Furthermore, the application may utilize a GPS device in the smart phone to formulate or provide map and/or direction information from one property to another.

In another embodiment, variation, or feature, a lockset may be provided with a sticker, disposed on the exterior thereof, that is an NFC device. Users may swipe their phone over the NFC sticker which will do one or more of the following:

- For Verification:
  - Take users to the Call-A-Key 2.0 public facing website verification page
  - Take users to a Call-A-Key Mobile Application (Iphone, IPad, Android operating systems) for verification and future home tours
  - Connect directly to Call Center via Chat or VoiP
  - Provide option to call the Call-Center
- For Receiving the Opening Code which is punched in by user In another embodiment, variation, or feature, an NFC device may be integrated into a lockset. A user may swipe their phone over the lockset, and in conjunction with a mobile application, carry out one or more following:

- A user may be able to pre-determine their verification online using a corresponding website and this information may also be shared with the mobile application. This may enable the application to pair with the NFC enabled lockset such that it may be unlocked using only swipe technology rather than by physically entering the access code.
- A user may swipe his phone on the NFC enabled lockset, causing it to download and/or open the mobile application. The user may then be verified based on information from one or more categories, including credit card information stored in the phone, phone number, other personal information, and the like.
- A user may be verified or rejected. If verified, the application may enable the phone to be swiped for access control and the unit will unlock granting access.

In another embodiment, variation, or feature, a lockset may include a wireless card. A user may call, use NFC, or the like to request an access code to open the lock. After verification, a unique, one-time use code may be created by a server and sent to the user's phone and to the lock simultaneously (or in close proximity to each other). The code may be entered by the user entering it manually into the lockset, or by swiping the phone, using NFC or other technology, into the lockset.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A method of controlling access by potential buyers to a house being offered for sale, comprising:

(a) providing an electronically-controlled lockset, including a locking mechanism, that may be controlled to release the locking mechanism when a dynamic access code, received by the lockset from a user, matches a first dynamic access code that is programmed internally by the lockset and whose value changes periodically over time and is synchronized with a reference device without communication between the lockset and the reference device;

(b) temporarily installing the electronically-controlled lockset, including the locking mechanism, on an exterior door of the house being offered for sale such that the locking mechanism is disposed in operable relationship with a door frame in which the exterior door is installed and such that the state of the locking mechanism controls whether the exterior door may be opened, the lockset being adapted to release the locking mechanism, thereby permitting the door to be opened, upon receiving, as input, the then-current proper value of the first dynamic access code;

(c) maintaining the reference device at a separate real estate agent location that is located remotely from the house being offered for sale, the reference device being adapted to present a then-current periodically changing value of a second dynamic access code to one or more users located in the real estate agent location, the second dynamic access code being programmed internally by the reference device and time-synchronized with the first dynamic access code programmed in the electronically-controlled lockset such that the value presented by the reference device is the same as the then-current value of the first dynamic access code;

(d) as part of a process of showing the house being offered for sale to prospective buyers, repeatedly:

(i) receiving, at the separate real estate agent location, a request for real-time communication from a user wishing to access the house, (ii) during the real-time communication, receiving, at the separate real estate agent location, a request, from the user wishing to access the house, for access to the house, (iii) the value of the second dynamic access code that is currently being presented by the reference device at the time of the request, (iv) examining, at the separate real estate agent location, the reference device to determine the value of the second dynamic access code that is being presented, at the time of the real-time communication, by the reference device, and (v) based on the examining step, providing the determined current value of the second dynamic access code to the user for timely input into the electronically-controlled lockset; and (e) after the house is sold, removing and replacing the electronically-controlled lockset with a conventional lockset.

2. The method of claim 1, wherein the repeated steps of the real-time communication are real-time voice communications.

3. The method of claim 2, wherein the repeated step of providing the determined current value of the second dynamic access code to the user for timely input into the electronically-controlled lockset is carried out as part of the real-time voice communications.

4. The method of claim 2, further comprising a step, as part of the repeating process of showing the house being offered for sale to prospective buyers, of maintaining real-time communication between the separate real estate agent location and the user wishing to access the house while the user inputs the determined current value of the second dynamic access code into the electronically-controlled lockset.

5. The method of claim 4, further comprising a step, as part of the repeating process of showing the house being offered for sale to prospective buyers, of maintaining real-time communication between the separate real estate agent location and the user wishing to access the house while the user tours the house.

6. The method of claim 5, wherein the step of maintaining real-time communication between the separate real estate agent location and the user wishing to access the house while the user tours the house includes providing information about the house to the user.

7. The method of claim 4, wherein the step of inputting the determined current value of the second dynamic code includes communicating with the lockset via near field communication (NFC) technology.

8. The method of claim 1, wherein the repeating process of showing the house being offered for sale to prospective buyers includes a step, in response to the step of receiving a request for a code, of conducting, during the real-time communication, a qualification procedure for the purpose of screening the user.

9. The method of claim 8, wherein the repeated step of providing the determined current value of the second dynamic access code to the user for timely input into the electronically-controlled lockset is conditioned upon a determination, based upon the qualification procedure, that the user is qualified to gain access to the house.

10. The method of claim 1, further comprising the steps of:

receiving, by the electronically-controlled lockset, the current value of the second dynamic access code as input by the user; and if the received value of the second dynamic access code is the same as the first dynamic access code, unlocking the lockset.

11. The method of claim 10, further comprising the steps of:

changing, on a periodic basis, the value of the first dynamic access code; and changing, on a periodic basis, the value of the second dynamic access code such that the value of the second dynamic access code remains synchronized with the value of the first dynamic access code.

12. The method of claim 11, further comprising the step of preventing an unauthorized user from retrieving the first dynamic access code from the electronically-controlled lockset.

13. The method of claim 11, wherein the step of installing includes installing a dynamic electronically-controlled lockset having a housing that encloses an electronics assembly including a control module that receives inputs from both an electronic code module and a user input device.

14. The method of claim 13, further comprising the step of:

comparing, by the control module, the received value of the second dynamic access code to the first dynamic access code.

15. The method of claim 11, further comprising the step of: generating each value of the first dynamic access code using a pseudorandom number generation algorithm.

16. The method of claim 15, further comprising the step of: generating each value of the second dynamic access code using the same pseudorandom number generation algorithm that is used to generate each value of the first dynamic access code.

17. The method of claim 16, wherein generating each value of the first and second dynamic access codes includes incorporating a value representative of a current time and a value identifying the lockset.

18. The method of claim 11, wherein the step of maintaining the reference device includes maintaining the reference device at a real estate office that is located remotely from the real estate property.

19. The method of claim 11, wherein the step of maintaining the reference device includes maintaining the reference device on the person of the real estate agent located remotely from the real estate property.

20. The method of claim 11, wherein the step of examining the reference device includes examining a digital display that visually presents the current value of the second dynamic access code.

* * * * *